United States Patent [19]

Stamm

[11] 4,381,544
[45] Apr. 26, 1983

[54] PROCESS AND APPARATUS FOR GEOTECHNIC EXPLORATION

[75] Inventor: Michael E. Stamm, Sandy, Utah

[73] Assignee: Northwest Energy Company, Salt Lake City, Utah

[21] Appl. No.: 204,781

[22] Filed: Nov. 7, 1980

[51] Int. Cl.³ ............................................. G01V 3/12
[52] U.S. Cl. .................................. 364/420; 324/330; 324/337
[58] Field of Search ............... 324/330, 337; 364/420, 364/515

[56] References Cited

U.S. PATENT DOCUMENTS

| | | | |
|---|---|---|---|
| 3,351,936 | 11/1967 | Feder | 324/330 X |
| 3,490,032 | 1/1970 | Zurflueh | 324/8 |
| 3,604,660 | 9/1971 | Marley | 244/17.11 |
| 3,663,953 | 5/1972 | Salvi | 324/43 R |
| 3,665,466 | 5/1972 | Hibbard | 324/330 X |
| 3,753,134 | 8/1973 | Unterberger | 324/330 X |
| 3,806,795 | 4/1974 | Morey | 324/337 |
| 3,808,519 | 4/1974 | Lemercier et al. | 324/3 |
| 3,828,245 | 8/1974 | Unterberger | 324/330 |
| 3,976,937 | 8/1976 | Hearn | 324/4 |
| 4,100,481 | 7/1978 | Gournay | 324/330 X |
| 4,308,499 | 12/1981 | Thierbach et al. | 324/337 |

OTHER PUBLICATIONS

*Radar Probing of Victorio Peak,* N.M., L. T. Dolphin et al., "Geophysics", vol. 43, No. 7, pp. 1441-1448.
*A Review of Electrical Resistivity* etc., Steven Arcone, "Materials Performance," May 1979, pp. 32-37.
*Impulse Radar Sounding in Permafrost,* A. P. Annan et al., "Radio Science", vol. 11, No. 4, Apr. 1976, pp. 383-394.

*Primary Examiner*—Edward J. Wise
*Attorney, Agent, or Firm*—Robert S. Bramson

[57] ABSTRACT

A process for geotechnic exploration comprising the steps of:
(a) Emitting one or more brief electromagnetic pulses or waves from an airborne platform at regular intervals based on the airspeed of the platform and the area being surveyed;
(b) The wavelengths, frequencies and cyclicity of the waves being selected to provide, upon reflection, satisfactory indicia of the physical characteristics of the area being measured;
(c) Receiving the reflections of said waves at said platform;
(d) Amplifying said reflected waves to a readily processable level;
(e) Processing said waves to enhance the spatial resolution of images produced therefrom;
(f) Further processing said waves by selecting those variables represented by the waves that are deemed relevant;
(g) Displaying said waves in visual form representing a cross-section of an area;
(h) If desired, storing in recoverable form the signals representing said variables; and
(i) Repeating said process as often as desired.

The invention includes the aircraft-mounted radar apparatus for performing the process.

10 Claims, 3 Drawing Figures

COMPARISON OF GEOTECHNIC METHODS

| | BOREHOLE | RESISTIVITY | RADAR SOUNDER |
|---|---|---|---|
| DATA ACQUISITION | GROUND | GROUND | AIRBOURNE |
| PERMIT REQUIRED (FROM LAND OWNER) | YES | YES | NO |
| MEASUREMENT TYPE | LINEAR/POINT | BULK/CONTINUOUS | LINEAR/CONTINUOUS |
| DATA DEPTH | >50 FT. | 20 FT. | 50 FT. |
| HORIZONTAL RESOLUTION | 4 IN. | 12 FT. | 2 FT. |
| VERTICAL RESOLUTION | <2 IN. | VARIABLE FREEZE/THAW LINE ONLY | 3 IN. |
| MAXIMUM DATA SPEED | .7 PER SHIFT (12 HOURS) | 3 MPH | 100 MPH |

*Fig. 1*

| PARTICLE SIZE (CM) | SHORT WAVELENGTH | INTERMEDIATE WAVELENGTH | LONG WAVELENGTH |
|---|---|---|---|
| 0.05 (SAND) | SMOOTH | SMOOTH | SMOOTH |
| 0.10 (GRAVEL) | INTERMEDIATE | SMOOTH | SMOOTH |
| 0.5 (SILT) | ROUGH | INTERMEDIATE | SMOOTH |
| 1.5 (COBBLES) | ROUGH | ROUGH | INTERMEDIATE |
| 10.0 (BOULDERS) | ROUGH | ROUGH | ROUGH |

*Fig. 3*

PROCESS AND APPARATUS FOR GEOTECHNIC EXPLORATION

BACKGROUND OF THE INVENTION (a) Field of the Invention

This invention relates to a process for conducting exploration of the earth's sub-surface up to depths of about fifty feet, by the use of electromagnetic waves emanating from an airborne source.

(b) Prior Art

Various forms of wave energy have been used for the purpose of "mapping" differing depths of the sub-surface of the earth without using equipment which physically penetrates the surface. Although some such techniques have been attempted commercially, there is not now a commercially usable process for relatively high speed and relatively accurate "mapping" of the sub-surface of the earth.

For example, when pipelines are to be installed, in areas such as Alaska, knowledge of the condition of the earth's crust is important in order to know where patches of ice or other obstacles can be found. It is desirable to know this in advance, before digging a trench to bury the pipe, in order to avoid substantial expenditures of time and money, digging in areas which have substantial patches of ice or other obstacles, because of the expense and difficulty of digging through ice or boulders, for example.

After a pipeline has been laid below the surface in a frozen area, such as in Alaska, it is important to check the condition of the ground surrounding the pipe line to locate any areas in which the ice has thawed, because if substantial thawing takes place, the ground support of the pipe section in the thawed area is lost, and the pipe might collapse, resulting in leakage and loss of the oil or gas transported in the pipeline and the considerable expenditure required to locate, excavate and repair the leaking pipeline and the attendant environmental damage.

One well known pipeline is the oil pipeline which transports crude oil in Alaska from Prudhoe Bay to Valdez. Another pipeline is planned to transport natural gas from Prudhoe Bay, Alaska to Chicago and to San Francisco. These pipelines are of enormous importance to the energy independence and economy of the United States, and the extreme weather conditions present in Alaska (and other similar geographic areas) makes it important to be able to do sub-surface surveying accurately and speedily and with minimum cost. The expense of digging and tunnelling makes it desirable to know the condition of the sub-surface in areas of less extreme climactic conditions, such as where large underground boulders might present a problem.

There are two prior art techniques which are now used commercially for checking for the presence or absence of ice below the earth's surface. The first involves digging a bore hole, typically about fifty feet deep, and taking a core sample (e.g., fifty feet deep by four inches in diameter) to look at an actual physical cross-section of the soil to determine its condition. This technique is obviously slow, and it takes approximately fifteen hours to dig a single hole. As of mid-1980, the cost of digging a single bore hole in Alaska was about $15,000.00. Typically, these bore holes are dug at intervals of about one mile, because of their considerable expense. The bore hole technique will give an accurate indication of the condition of the sample taken, but it does not necessarily give an accurate indication of sub-surface conditions proximate to or remote from the bore hole. For example, the bore hole could be two or three feet from a sub-surface ice formation, and yet not detect the presence of that ice.

Another technique which is currently commercially used involves the measurement of the resistivity of a given sub-surface area, in which probes are inserted into the ground to measure the resistivity of the area beneath and around the probes. This technique, which had an approximate cost of $1,300 per mile as of mid-1980, will provide relevant information for a cube, each side of which is twelve feet by twelve feet and centered about the probe, but this technique is also slow, does not provide all of the necessary information, and is limited to the area measured.

Numerous articles have been published and patents granted which deal with equipment and techniques to locate sub-surface ice formations, but none of those which are known is satisfactory for use on a commercial scale, because they do have the capability to get a sufficient depth or a sufficient accuracy or resolution of the area being surveyed. For example, U.S. Pat. No. 3,665,466 shows one technique for measuring the thickness of ice, but this process is limited to the ability to measure sea ice at the surface.

To the best of applicant's knowledge, there is no presently available or disclosed technique which has the capability of measuring cross-sections of the sub-surface of the earth to depths of fifty feet at a relatively high speed of, for example, fifty to one hundred miles per hour.

The importance of accurately laying out a path for an underground pipe line is indicated by the fact that the cost of making a trench in Alaska, which is set up as an assembly line operation, was approximately $1,500,000 per day at mid-1980. Therefore, if a trench is improperly laid out and must be re-routed, substantial waste will have occurred.

FIG. 1 is a chart which compares certain significant aspects of the two prior art techniques for geotechnic surveying with the instant invention.

BRIEF SUMMARY OF THE INVENTION

The invention is directed to a process and apparatus for geotechnic exploration. As used herein, "geotechnic" exploration means exploration of the composition of the area down from the earth's surface to approximately fifty feet below the surface of the earth.

In the performance of the process, an airborne platform, preferably a helicopter, mounts all of the equipment necessary for the operation of the process. Included in that equipment are a microwave generator, which is connected to a suitable microwave antenna mounted outside of the aircraft body. The generator produces three sequential pulses, respectively of short, medium and long wavelengths and of frequencies in the range from about 100 to about 1500 mHz and desirably of about 280, 480 and 1300 mHz, for example. The pulses are preferably extremely short single cycle pulses of nanoseconds (order of magnitude) duration, and the airborne platform is desirably flown at a level of about one hundred feet above the ground, although higher elevations are possible. In addition, although the platform can desirably fly at an airspeed of about sixty knots and desirably from about twenty to about one hundred knots, the airspeed is variable within wide ranges. However, the complexity of the required radar system is unnecessarily great (and therefore uneconomical) at airspeeds above one hundred knots.

In the process of this invention, geotechnic exploration is accomplished by radiating a plurality of microwave pulses, preferably three pulses, from one airborne antenna or several antennae, to the ground. Part of each radiated pulse penetrates the ground and is absorbed or scattered and reflected by changes in the subsurface dielectric properties, at the interfaces between materials having different dielectric properties. The amount of radiation absorption and scattering will depend upon the distance travelled by the signal and the dielectric properties at the interface between layers of different materials.

A detector mounted on the airborne platform senses the reflected signals, and has an empirically predetermined set of reflection criteria for each material interface. For example, with a set of incident pulses of given wavelengths, a sand above gravel interface would produce one result, a gravel above sand interface would provide a different result and a sand above ice interface yet another result. These results are approximately constant for specified incident wavelengths and types of materials. Therefore, when the three reflected or radiating pulses are sensed, the strength of those three pulses in relation to each other characterizes the nature of the two materials at each interface, after the reflected pulses have been filtered for extraneous noise, and adjusted to a standard to take into account any distortion which may have occurred. For example, a cylindrical pipe on an uncorrected signal may appear as somewhat elliptical. If it is known that the pipe is cylindrical, then the elliptical image can be corrected to appear on a CRT screen or photograph as cylindrical and the correction then can be applied to the other portions of the output.

In the practice of this invention, it is desirable to produce hard copy, in the form of color photographic prints, indicating the cross-sections taken, to make them easily visually read, and the hard copy can be color coded so that different materials will have different colors, to accentuate the visual impact of the different materials.

The signal can also be stored in a suitable recording unit, in tape or disc form, for example, for future use.

Although the process and apparatus of the invention are particularly intended for surveying frozen ground for the location of pipes before or after they are laid, they are also useful for other purposes. For example, they may be used in archaeological exploration for the purpose of locating covered archaeological sites which may be suitable for archaeological exploration. They may be used in temperate or tropical climates where underground pipes are to be dug to locate underground obstacles (such as boulders) which would interfere with the trench-digging process. The process and apparatus may also be used for other forms of geologic exploration. The process and apparatus could have military application for the location of underground silos. The process and apparatus could also be used to monitor a pipeline to detect thaw areas around the pipeline and anticipate the pipeline cracking which can result in the area of the thaw where the pipe section loses support.

OBJECTS OF THIS INVENTION

It is therefore an object of this invention to provide a process for mapping a cross-section of the earth's subsurface, capable of producing accurate determinations of the gross composition of the sub-surface and of being performed at relatively high speeds from an airborne platform.

Another object of this invention is to provide a process for the accurate, airborne evaluation of sub-surface areas, so that sites for laying pipeline and sites in which pipelines have been laid in locales of extreme ground conditions may readily be surveyed.

The foregoing objects will be apparent from the following detailed description of the invention, when taken in conjunction with the drawings hereof.

DESCRIPTION OF THE DRAWINGS

FIG. 1 is a chart, which compares some advantages and disadvantages of the two currently used techniques for pipeline site surveying, compared with the present invention;

FIG. 3 is a schematic diagram of the process of this invention.

DETAILED DESCRIPTION OF THE INVENTION

Figure 2:
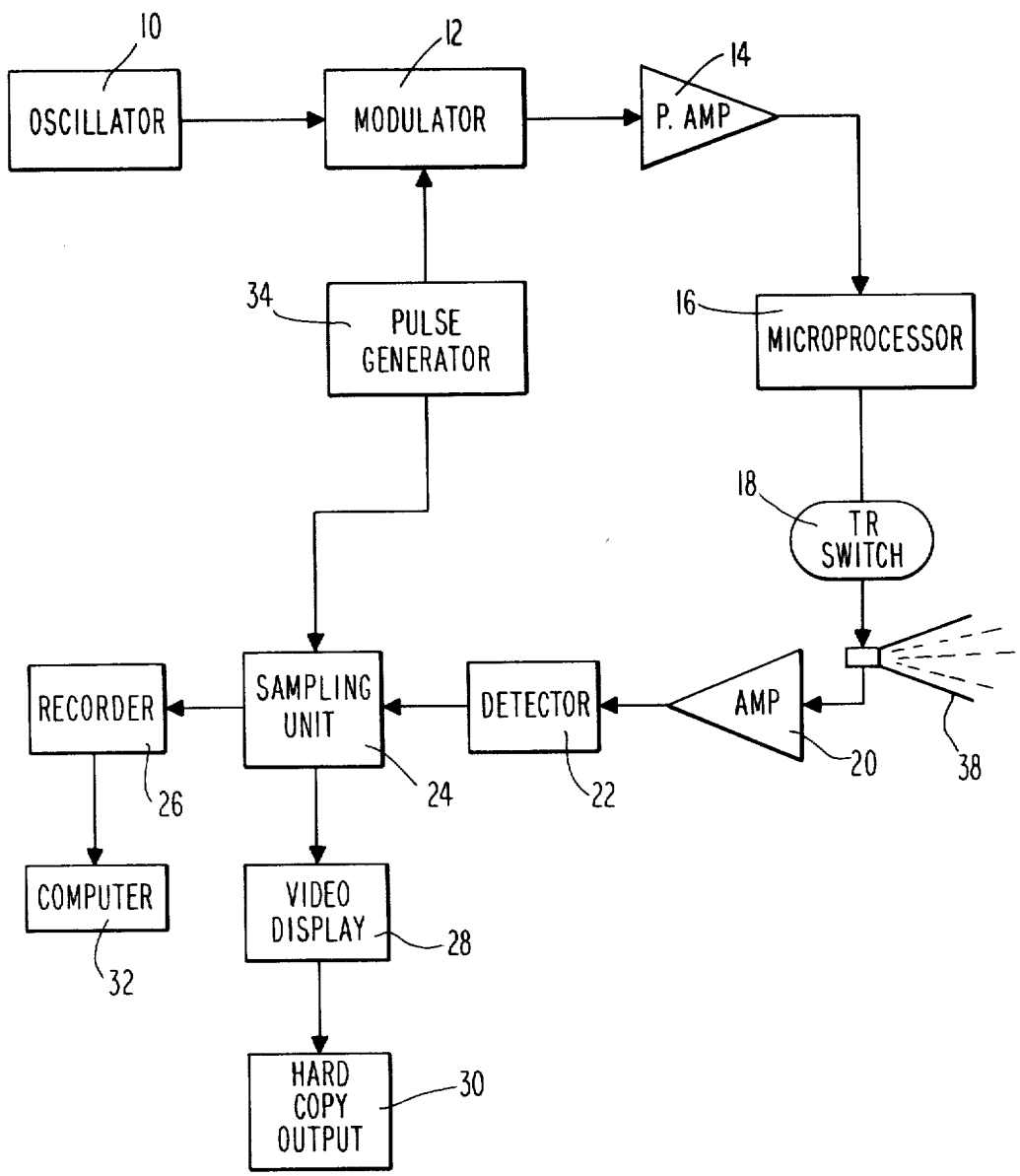
FIG. 2 is a matrix used to determine different types of materials.

Considering FIG. 1, there is charted a comparison of some of the important distinctions between the process of this invention (described in the third column) and the other two processes of the prior art, which the chart indicates are much more expensive, time consuming, cumbersome and inaccurate than the process of the invention. The process and apparatus of the invention uses known radar technology theory, and applies it in a manner not heretofore taught or suggested by the prior art.

In practicing the process of the invention, it is preferable to use four different wavelength pulses of microwave energy. One is produced as part of an altimeter unit, which may be a commercially available unit, such as a Cullen ALT 50 radar altimeter. The altimeter readings are used as a basis for comparing the other three reflected waves, to determine the depths of varying reflected signals, by comparing the time taken to sense the reflected altimeter pulse, when it reflects from the upper surface of the area being surveyed, and the other pulses as they are reflected by sub-surface strata and materials. The altimeter cues the antenna receiver apparatus when to receive and the pulse generator when to send another pulse, in coordination with the position indicator (described below). Thus the pulses are generated and received only when necessary to produce and sense the pulses desired to be measured and thus to avoid the necessity to account for much extraneous information which would otherwise be received.

It is to be noted that the typical types of materials to be encountered in doing geotechnic exploration in the Alaskan tundra (where the ability to do accurate aerial surveying of pipeline sites and existing pipelines for oil and gas is very important) comprises the following materials: ice (which may be salt water ice or fresh water ice); water or party thawed ice; sand; gravel; bedrock; and cobble (pieces of stone, larger than pebbles and smaller than bedrock). Other sub-surface materials will vary with the type of terrain being surveyed. Materials in any cross-section of the earth's surface are not present in regular strata, but rather are present in random and irregular shapes. The practice of the invention is based on the fact that the energy loss pattern of radiant energy (such as microwave energy) dissemenated, for example, from an airborne platform at any area of cross-section of the sub-surface of the earth is dependent upon the dielectric characteristics of the interface between the different materials (if in fact there are different materials) at that area. The information which is used in the process of this invention about the reflected signal for each wave-length of incident microwave energy are the strength of the reflection and its phase.

In the process of this invention, four microwave pulses are used. One pulse is simply used as an altimeter, to determine the height of the airborne platform and to establish the depth of penetration of the earth by the three other microwave pulses in comparison to the first. In selecting the three microwave pulses to be used to characterize the particular materials being surveyed, pulses are selected which will uniquely describe, when measured alone and in combination, when reflected from a dielectric interface between any two materials being sensed, those two materials. The reflection characteristics which define a particular interface between materials are determined empirically. It has been determined that microwave pulses of 280, 480 and 1,300 mHz are particularly suitable in characterizing the Alaskan tundra, although other wavelengths and combinations are usable within the purview of this invention. One pulse is selected of relatively short wavelength, one of relatively long wavelength and one of intermediate wavelength. The wavelengths are sufficiently different as not to be confused with each other and to be able accurately to characterize the particles being measured because of their different reflective characteristics.

If three spacially chosen frequencies are radiated at the same time, the return of each may be ratioed with the others to characterize approximately the soil types. These are determined from the "roughness" characteristic (degree of scattering) of the return. When the soil particle diameter is approximately five percent of the emitted wavelength, scattering begins to occur. The larger this percentage (particle diameter to wavelength), the more scattering there is. When, for example, a long wavelength pulse passes through slit, sand, or gravels (which are relatively small in diameter) there is no "roughness" in the return; hence it is "smooth." When the same pulse passes through cobbles, the "roughness" is intermediate, and through boulders, it is "rough." When a short wavelength pulse passes through silt, it is smooth; through sand, intermediate; and through gravels, cobbles, and boulders, it is rough. Hence, a "roughness" matrix can be generated to obtain the soil types from the response of the return radar signal. FIG. 2 shows such a matrix, which can be developed empirically for all types of sizes of particles encountered. The matrix allows three different wavelengths of microwave energy to characterize materials (e.g., sand, silt, gravel, cobbles) of different particle size. It is the particle size which determines the scattering characteristics of a material. Thus, three wavelengths can be used to establish a matrix as shown in FIG. 3 to determine the scattering characteristics of the materials being evaluated. It is to be noted that the use of three different wavelengths of microwave energy are adequate for the task although more wavelengths could be used if more precision information were needed. It might be possible to use only one or two different wavelengths to characterize the materials but the computer program needed to analyze the backscatter would be needlessly complicated for the purpose.

The matrix to be used is initially done empirically, but once done is accurate enough to be used in distant areas of similar geologic characteristics. This is to say, if a matrix is established for one end of a possible pipeline route being investigated and the route is two hundred miles long, passing through the same general types of geologic formations, a single matrix is accurate enough to characterize the entire two hundred miles.

The matrix is initially developed by exposing (or taking an already-exposed) a cut through the area to be surveyed, so that the location of various particle size materials can be determined and measuring the backscattering of each wavelength separately from the predetermined strata.

It is to be noted that fresh water ice is transparent to microwave pulses (that is, they will pass through the ice and not reflect or scatter) but this feature is useful in characterizing ice formations, since they will show up as "voids" (i.e., no reflected information) on a print-out or photograph, etc. of the area being evaluated. Thus, ice can be characterized precisely by the process of this invention.

If the ice mass has a large quantity of, say, silt suspended throughout a given area, this too will show up on the print-out as a hybrid between a solid ice mass and a solid mass of silt.

The microwave pulses used in this invention are very "short," which is to say they are on the order of several nanoseconds in duration or less. For example, if pulses having frequencies of 280, 480 and 1300 mHz are used, the duration of those pulses would respectively be 5 nanoseconds, 2 nanoseconds and 0.5 nanoseconds. Pulses of significantly longer duration would complicate the backscattering and require unnecessarily complex programs to analyze and even then would be less accurate than shorter pulses and produce visual (and electronic) images with less clear resolution. Although shorter pulse durations are better, there are technical and economic limits on the shortness of the pulses which can be achieved with current technology and at a realistic cost. However, should it become feasible to produce pulses of fractions of a nanosecond duration, at economical cost, these are desirable for use in the process of this invention.

The time period which is allowed to elapse between each generation of a sequence of three pulses is on the order of about one thousand nanoseconds, in order to permit a clear delineation between each sequence of pulses.

It is to be noted that the sub-surface geography is characterized not only by the scattering effect of the various sizes of particles, but also by the time which it takes for the microwave pulses to be received, since the pulses attenuate significantly at each dielectric interface between materials of two different particle sizes. These reflected pulses, then, not only characterize the nature of the materials at each dielectric interface, but also the depth of the interface below the aircraft (and therefore below the ground surface, since the altimeter pulses establish that level).

Single cycle microwave pulses, rather than multiple cycle pulses, are preferred in the practice of this invention, simply because single cycle pulses are easier and less expensive to create and, more important, are simpler and less expensive to receive and analyze. The single cycle pulses will produce optimum resolution and therefore clarity of the electronic pulse being received and therefore the visual image being created, so that the clearest and most easily read images are produced by the use of single cycle pulses. However, it is within the purview of this invention to use multiple-cycle pulses.

In practicing the process of the invention, the airborne platform is preferably a helicopter, because of the ease with which a helicopter can be maintained at a relatively low level above the surface without creating undue hazards. Although a wide variety of helicopters are usable, a preferred type of helicopter is a Bell Jet Ranger II helicopter. A helicopter is preferred to a standard take-off and landing (winged) aircraft, because it is safer and easier to handle at low speeds and low altitudes. Although helicopters are preferred, it is also within the purview of this invention to use conventional aircraft or airborne balloons, for example.

Mounted, preferably beneath the helicopter, is the antenna which is used to radiate the microwave pulses which are utilized to describe the character of the subsurface area being explored, and which also receives the reflected pulses. Although two or more antennae can be utilized, it is preferred to use a single antenna, simply because it is easier and more convenient to use, mount, calibrate and handle one antenna. It is, however, possible to have plural antennae for the purpose of radiating the microwave pulses and even to have an additional antenna or antennae for sensing the reflected pulses.

The antenna to be utilized is an important feature of the invention, and it is preferred to use a single cycle radiating antenna having a very broad band of frequencies of single cycle pulses which it can radiate and receive from about one hundred to about 1,500 mHz. The preferred type of antenna to be utilized is called a transverse electric mode (TEM) horn antenna. This type of antenna is not commercially available. However, given the desired characteristics of the antenna described herein, it is within the abilities of a skilled designer of radar antennae to design a TEM horn antenna which is suitable for use in the process of this invention. The criteria for designing the antenna are the frequency and duration of the microwave pulses to be sent and received, the beam width desired to be used (more fully discussed below) and the need for precision and clarity in radiating and receiving microwave pulses, so that, for example, the operation of the antenna will not be adversely affected by extraneous "noises."

For ease and convenience, it is desirable to use digital image processing, in which the characteristics which define the image to be used to describe the condition of the sub-surface are defined in terms of a binary system. For that reason, it is desirable to use a digital radar processing design for the antenna which is compatible with the digital image processing.

Although shorter pulse durations are better, there are technical and economic limits on the shortness of the pulses which can be achieved with current technology and at a realistic cost. However, should it become feasible to produce pulses of fractions of a nanosecond duration, at economical cost, these are desirable for use in the process of this invention.

It is also important that the antenna be properly designed to keep the reflected microwave signals from striking the helicopter body and causing the helicopter to vibrate and "ring", an obviously annoying characteristic to the occupants of the helicopter. The most desirable frequencies of the individual pulses desirably used in the process of this invention are respectively 280, 480 and 1,300 mHz. These frequencies are chosen arbitrarily within the range of 100 to 1,500 mHz reasonably capable of being radiated by a broad band, single cycle radiating antenna, and are arbitrarily selected to be sufficiently different from each other so that they will not interfere with each other and so that they can reasonably be ratioed. However, other frequencies and frequency interrelationships can also be chosen. For examples, frequencies of 200, 800 and 1200 mHz are also theoretically usable. However, there may be biological reasons for not using particular wavelengths. For example, the use of 700 mHz could interfere with the functioning of the hearts of persons proximate to pulses, and this obviously would not be acceptable.

Each set of frequencies chosen must be tested in use to determine the particular reflective characteristics which will be experienced at different material interfaces with the use of those frequencies. Once determined, those reflective characteristics are reasonably accurate and may be used for the same types of materials at different locations where the precise composition of the individual materials at different locations may vary. For example, the reflective characteristics for 280, 480 and 1300 mHz signals at one location will produce one result when reflected from an interface of sand above gravel. However, the chemical composition (e.g., mineral traces) and physical characteristics (e.g. particle size) may vary from one location to another. Notwithstanding this the reflective characteristics from one location to the other are close enough that reasonably accurate readings can be taken without adjusting for those differences. Frequencies below 100 mHz and above 1500 mHz could be used in the process of this invention, but they would be technically too difficult to produce and use.

The program which is established for operating the microwave detector 22 is established with a pre-determined set of reflection criteria for the three characterizing signals utilized in this process, in order accurately and carefully to characterize the materials being surveyed. The criteria for establishing the relationship between these three signals for each material are determined as described above. The wave length, frequency and number of cycles of the wave and number of waves being utilized are selected so that, upon reflection, they will provide a satisfactory indicia of the physical characteristics of the types of area being surveyed.

It is desirable to limit the beam width of the antenna being utilized, by controlling design of the antenna, for a beam angle and beam width at the ground as small as possible, for optimum clarity of image. Obviously, the higher the elevation of the airborne platform, the wider the beam width, and this is one reason why it is desired to maintain the airborne platform, during exploration, at a level that is reasonably close to the ground, preferably on the order of one hundred feet, in order to obtain a reasonably limited beam width, and, therefore, maintain a reasonably strong signal. The beam width and angle will be determined by the purpose for which the survey is being conducted. For example, if an existing pipeline is being surveyed there is no need for a wide beam, since all that is needed to be visualized is an area a few feet wider than the pipeline diameter. Thus, for this purpose a beam angle of about 10° at an aircraft elevation of about one hundred feet would be satisfactory. If a virgin area is being surveyed for possible installation of a pipeline, a wider terrain is desired to be studied and a beam angle of, say, 57° at an aircraft elevation of about one hundred feet could be utilized. The particular angle utilized is not critical. Rather, the beam angle is selected which will provide the maximum amount of information with maximum clarity for the particular antenna, elevation of aircraft, etc. being utilized.

If a narrow beam is utilized, the reflected information can be utilized without further breakdown. However, if a wide beam is utilized, so much information is received that the processor must be programmed to analyze the information in sections across the beam to be useful. Otherwise, the expense of additional computer time needed to analyze the data received from a wide beam would be excessive. It is to be noted that, whether a narrow or wide beam is utilized, the thickness of the beam (in the direction transverse to the plane of the angle) is desirably about two feet.

Trial and error will determine the optimum conditions for a given radar antenna design, aircraft elevation and microwave signals utilized. It has been found having an antenna of the type described having a "beam spot" (angle of radiated microwave pulses) of about 57° (at a platform elevation of about one hundred feet above ground) produces very good results when surveying a virgin area for the location of a pipeline.

The system of this invention is preferably operated so that a reading is received for every linear ten feet over which the platform flies, although this can easily be regulated to shorten or lengthen the distance, if desired, depending on the needs of the survey and the amount of data desired. The airspeed of the aircraft will have to be coordinated with the intervals of sub-surface cross-section being measured, to insure that the speed is slow enough to assure clear and accurate readings of the equipment and a clear and accurate output. Thus, if readings every ten feet are desired, an airspeed of about one hundred knots would be acceptable at a one hundred foot elevation. If readings every two feet were desired, all other things being equal, an airspeed of about sixty knots would be preferred to obtain clear and accurate readings Although elevation of the airborne platform is somewhat critical to assure accuracy and clarity of image, the antenna that is utilized can be modified to take into account the elevation at which the airborne platform is to be operated.

FIG. 2 is a schematic outline of suitable process equipment. Other types of pulse radar systems might also be utilized. The apparatus illustrated is, however, believed to be the simplest and therefore most desirable. The apparatus of this invention comprises an oscillator 10, which produces the signals to be emitted by the antenna. Each signal is processed through a modulator 12, which may be a pin diode to double balanced mixer, and is then amplified in power amplifier 14, which is preferably a class A amplifier. Each signal is then transmitted to the microprocessor 16 which controls the timing of the pulses, so that the pulses are radiated in a predetermined time sequence between the individual pulses of each series of three pulses and between the series of three pulses and between the series of three pulses. For example, a timing of one thousand nanoseconds between each of the three pulses of a series and one thousand nanoseconds between the last pulse of one series and the first pulse of the next is desirable, although this can be varied as desired to suit the needs of the situation. The microprocessor output is controlled by a TR (transmit-receive) switch 18, which is used to prevent receiver overloading during the transmit pulse.

The transmitted pulses then energize the antenna 36, which radiates pulses of predetermined frequency, cyclicity, duration and timing vertically toward the ground in a predetermined beam shape. The antenna 36 is mounted suitably on an airborne platform (not shown) such as the underside of an helicopter and emits and receives the radiated pulses and the reflected pulses. The modulator 12 is regulated by a pulse generator 34, which also releases timed pulses into a sampling unit 24. The pulse generator 34 thus provides the control pulses for comparison of the returned pulses. The return pulses are received by antenna 36, which may be the same (and is illustrated as being the same) as the emitting antenna, and are suitably amplified by amplifier 20. The amplified signals are then transmitted to a detector diode 22, which senses and compares the signals with the predetermined standards of the matrix illustrated in FIG. 3, for example, so that the characteristics of the surface being measured are determined. These are then compared in sampling unit 24 and the output of the sampling unit is recorded on magnetic tape, for example, by recorder 26 for suitable permanent recording and later processing. The reflected and analyzed information is also provided in hard copy output in printer 30, so that the cross-section can be visually examined. A video display 28 may also be desired to provide an instantaneous visual reading for the persons in the aircraft. It is important to note that the output must be related to the particular points at which the cross-sections are being evaluated. This is done by utilizing a suitable aircraft positioning system, such as a Global Positioning System, manufactured by Magnavox Corp. This input is provided to the sampling system so that its output includes an indicium of the location of the cross-section. The position indicator also regulates the pulse generator, so that pulses are generated on a geographic basis (e.g. every ten feet) rather than on a time basis (e.g. every ten seconds) because changes in aircraft speed would produce erratically spaced readings, whereas uniformly spaced readings are preferred. The position indicator also produces an input to the data tape for coordinating the "pictures" of the sub-surface of the earth with their linear positions.

The altimeter produces a "fourth" pulse in each sequence which is utilized when reflected to indicate the elevation of the aircraft above the ground. This is a reference for the measurement of the depth of the sub-surface dielectric interfaces measured by the reflection characteristics of the three pulse sequences.

For convenience in handling, the data which is derived from the pulses received by the antenna 36 is preferably digitized. Once that data has been digitized, the machinery necessary to analyze it is within the purview of the skilled artisan. Briefly, the processing of the returned signals requires the supression of any noise or extraneous signals in the raw image which is produced at the antenna, a geometry correction, as described above, to correct the geometry of the returned signal so that any object which are perceived as different from their true shape (such as a round pipe which is sensed as oblong, can be corrected to make the ultimate image look more realistic.) The signal is then brightness corrected, so that the intensity of the image being recorded is the same, independent of the depth at which the image is sent, and the brightness corrected image is then color coded for the different variables. Arbitrary colors are assigned, on a consistent basis, to the various components of the cross-section in the area, such as blue for boulders, red for cobble, green for pebbles, yellow for sand, etc. A Quantex D5301 or International Imaging System VIP 1776 color unit can correct for color and produce the desired photographic output. The image processing required is relatively standard technology. Computer processing of images is not new; the military and intelligence communities have employed digital image processing for a number of years. Any image may be thought of as consisting of tiny equal areas or picture elements arranged in regular rows and columns. The position of any picture element is determined by an x and a y coordinate. The brightness of each element is assigned a number ranging from black equals zero to white equals some higher number, usually in powers of 2. For example, the picture may have $2^5$ or 32 shades of gray. Thus, any picture may be described by a series of three numbers which are the x and y position coordinates of each picture element and the gray scale intensity value. This three dimensional array, when fed into a computer core, may be easily manipulated by suitable software to display the desired variables.

The following describes computer processing from the raw image through color-density assignments of a slow traverse of a segment of the Alyeska pipeline. In the raw data display, the intensity of the radar return is assigned to a gray scale, no return being black, intense return being white. The helicopter clutter is the brightest feature of the image, consisting of alternating light and dark bands. Against this background, the surface of the ground appears dark. This noise is removed, allowing the sky to become dead black, or zero return, and eliminating the unwanted clutter in the rest of the image. The pipe is, at this point in the processing, unclear. The next step is to brightness correct, so that a feature near the surface has the same brightness as it would have if it were deep underground. At this point, the pipe is plainly seen, but, unfortunately, is the wrong shape. The image is, therefore, geometrically corrected to give a 1:1 horizontal to vertical aspect ratio. Although the pipe is now easily seen and geometrically "correct," there are other areas in the image which appear as bright. Physiologically, the human eye is a color receptor; it does not distinguish well among shades of gray. The image is then color coded, black being black and white transformed into red, in rainbow fashion so that different areas (representing different particle sizes) of the image may be easily correlated. It is then possible to manipulate the image in any manner desired, for example to magnify the area containing the pipe to examine the fine structure not previously displayed.

The purpose of computer 32 is to analyze the recorded data for any variable, such as time rate of change, which was not otherwise performed by the apparatus. It is useful to know the geologic changes, such as development or movement of permafrost, which occur around a pipeline from time to time. The computer can have stored the conditions of a given length of pipeline when surveyed in prior years by the process of the invention to allow trends in changing geologic conditions to be seen, so that corrective or preventive measures can be planned and taken.

It will therefore be apparent that the invention constitutes an efficient, effective, rapid and relatively inexpensive process and apparatus for geotechnic survey. The process of the invention is not suitable at depths significantly in excess of fifty feet because there is too much attenuation and scattering of the microwaves and the antenna does not receive strong enough signals to permit their clear evaluation. This is because, if the microwave has an energy level of 100 dB about 2 dB is lost per foot (energy is lost both entering and leaving the ground) so that almost no reflected energy is sensed by the antenna. It is not possible to generate a pulse level, at the present state of the art, substantially in excess of 100 dB and which can conveniently and economically be handled on an airborne platform. However, if and when this limitation is no longer significant, still deeper levels of the earth's subsurface could be explored using the process and apparatus of this invention.

The process and apparatus of the invention can be used to examine the sub-surface preparatory to digging an excavation to lay a pipeline. The process and apparatus may also be used after a pipeline has been laid to determine if any areas of ice around the pipeline have thawed, so that the stability of the pipeline is jeopardized.

Sometimes pipelines cross rivers, and the depth of the river and the condition of the sub-soil of the riverbed must be determined, so that the decision can be made to tunnel under the river for delivery of the pipeline or to use an aerial suspension bridge to support the pipeline. In determining the condition of the riverbed, the presence of bedrock is very important, because of the difficulty of tunnelling through bedrock. Therefore, the process and apparatus of this invention are also particularly useful in determining whether or not to dig tunnels under rivers for the purpose of burying pipelines. This same information can also be utilized in determining whether and, if so, where, to dig conventional transportation (automobile, etc.) tunnels under rivers, although in that instance, the speed advantage of the airborne radar (as opposed to water-borne radar) is less significant.

The process and apparatus of the invention can also be used for geological exploration for other materials, archeological exploration and other applications which will be obvious to the skilled artisan.

It will therefore be seen that the process of the invention, for geotechnic exploration, comprises the steps of:

(a) Emitting at least one electromagnetic pulse toward the ground from an airborne platform, at regular intervals, based on the airspeed of the platform and the area surveyed, the wave lengths, frequency, cyclicity and timing of the waves being selected to provide, upon reflection, satisfactory indicia of the physical characteristics of the area being surveyed;

(b) Receiving the reflected pulses on said platform;

(c) Amplifying the reflected pulses to a readily processable level;

(d) Processing the reflected pulses to enhance spatial resolution of images produced by said pulses;

(e) Processing the reflected pulses by selecting those variables deemed relevant;

(f) Displaying the reflected pulses in visual form representing a cross-section of an area being viewed;

(g) If desired, storing said pulses in recoverable form; and (h) Repeating said process as often as desired.

It will be appreciated that numerous changes can be made in the process and apparatus of this invention as disclosed, without departing from the spirit and scope of the invention. For example, the particular number of waves selected, their cyclicity, frequency, wavelength and timing, the use of one or more antennas and the types of antennae utilized can all be varied within reasonable limits within the spirit and scope of this invention.

What is claimed is:

1. A process for geotechnic exploration comprising the steps of:
   (a) Emitting at least three electromagnetic pulses toward the ground from an airborne platform at regular intervals, based on the airspeed of the platform and the area being surveyed the wavelengths, frequencies, cyclicity and timing of the pulses being selected to provide, upon reflection, satisfactory indicia of the physical characteristics of the area being measured;
   (b) Receiving the reflections of said pulses at said platform;
   (c) Amplifying the reflected pulses to a readily processible level;
   (d) Processing the reflected pulses to enhance the spatial resolution of images produced therefrom;
   (e) Further processing the reflected pulses by selecting those variables represented by the pulses that are deemed relevant;
   (f) Displaying the reflected pulses in visual form representing a cross-section of an area;
   (g) If desired, storing in recoverable form the pulses representing said variables; and
   (h) Repeating said process as often as desired.

2. A process as set forth in claim 1, wherein said three electromagnetic pulses have different frequencies in the range from about 100 mHz to about 1500 mHz.

3. A process as set forth in claim 1, wherein said pulses are single cycle pulses, the duration of each pulse is in the range from about one to about five nanoseconds.

4. A process as set forth in claim 1, wherein said pulses are single cycle pulses, having respective frequencies in the range from about 100 mHz to about 1500 mHz and of duration in the range from about one to about five nanoseconds.

5. A process as set forth in claim 1, including the step of color-coding said visual image and correcting for geometric distortion to produce an easily read color-coded picture of a section of the earth being surveyed.

6. Apparatus for airborne geotechnic exploration, comprising:
   (a) Antenna means adapted to produce short microwave pulses in the range from about 100 mHz to about 1500 mHz;
   (b) Antenna means adapted to receive microwave pulses in the range from about 100 mHz to about 1500 mHz; and
   (c) Means to produce a visual output representing a cross-section of the earth's sub-surface exposed to said microwave pulses.

7. Apparatus as set forth in claim 6, wherein said two antennae means comprises a single transverse electric mode horn antenna.

8. Apparatus as set forth in claim 6, wherein said antenna means produces single cycle microwave pulses in the range from about 100 mHz to about 1500 mHz and of duration in the range from about one to about five nanoseconds.

9. Apparatus as set forth in claim 6, wherein said last-named means includes means to geometrically correct the visual output and to color code the output.

10. Apparatus as set forth in claim 6, including means to measure and relate the linear position of the antenna means to the visual output produced.

* * * * *